US011544492B2

(12) United States Patent
Teter et al.

(10) Patent No.: US 11,544,492 B2
(45) Date of Patent: Jan. 3, 2023

(54) LEARNING AUTOMATON AND LOW-PASS FILTER HAVING A PASS BAND THAT WIDENS OVER TIME

(71) Applicant: Raytheon Company, Waltham, MA (US)

(72) Inventors: Marcus Alton Teter, Belgrade, MT (US); Natalie Rae Plotkin, Denver, CO (US); Scott Allen Imhoff, Parker, CO (US); Walter Parish Gililland, Jr., Aurora, CO (US); Austin Jay Jorgensen, Littleton, CO (US)

(73) Assignee: Raytheon Company, Waltham, MA (US)

( * ) Notice: Subject to any disclaimer, the term of this patent is extended or adjusted under 35 U.S.C. 154(b) by 1022 days.

(21) Appl. No.: 16/251,819

(22) Filed: Jan. 18, 2019

(65) Prior Publication Data

US 2019/0228256 A1  Jul. 25, 2019

Related U.S. Application Data

(60) Provisional application No. 62/619,312, filed on Jan. 19, 2018.

(51) Int. Cl.
*G06F 16/00* (2019.01)
*G06K 9/62* (2022.01)
*G06F 17/14* (2006.01)
*G06N 20/00* (2019.01)

(52) U.S. Cl.
CPC .......... *G06K 9/623* (2013.01); *G06F 17/142* (2013.01); *G06K 9/6288* (2013.01); *G06N 20/00* (2019.01)

(58) Field of Classification Search
CPC .... G06K 9/623; G06K 9/6288; G06F 17/142; G06N 20/00; G06N 3/126; G06N 3/006
See application file for complete search history.

(56) References Cited

U.S. PATENT DOCUMENTS

| | | | |
|---|---|---|---|
| 5,481,269 A | 1/1996 | Imhoff et al. | |
| 6,839,698 B2 | 1/2005 | Nguyen et al. | |
| 2014/0278336 A1* | 9/2014 | Kozloski | G06F 30/20 703/22 |

* cited by examiner

*Primary Examiner* — Jared M Bibbee
(74) *Attorney, Agent, or Firm* — Schwegman Lundberg & Woessner, P.A.

(57) ABSTRACT

A learning automaton can be trained to merge data from input data streams, optionally with different data rates, into a single output data stream. The learning automaton can learn over time from the input data streams. The input data streams can be low-pass filtered to suppress data having frequencies greater than a time-varying cutoff frequency. Initially, the cutoff frequency can be relatively low, so that the effective data rates of the input data streams are all equal. This can ensure that initially, high data-rate data does not overwhelm low data-rate data. As the learning automaton learns, an entropy of the learning automaton changes more slowly, and the cutoff frequency is increased over time. When the entropy of the learning automaton has stabilized, the training is completed, and the cutoff frequency can be large enough to pass all the input data streams, unfiltered, to the learning automaton.

20 Claims, 4 Drawing Sheets

LEARNING AUTOMATON AND LOW-PASS FILTER HAVING A PASS BAND THAT WIDENS OVER TIME

CROSS-REFERENCE TO RELATED APPLICATION

This application claims the benefit of U.S. Provisional Application No. 62/619,312, filed Jan. 19, 2018, which is hereby incorporated by reference in its entirety.

FIELD OF THE DISCLOSURE

The present disclosure relates generally to a learning automaton that can merge data from multiple data streams.

BACKGROUND OF THE DISCLOSURE

Merging data from multiple data streams can be difficult if the data streams have different data rates. For example, processing involved with knowledge discovery can end up being weighted by a data stream having a relatively high data rate, because such a data stream can have more data than a comparable data stream with a relatively low data rate.

BRIEF DESCRIPTION OF THE DRAWINGS

Corresponding reference characters indicate corresponding parts throughout the several views. Elements in the drawings are not necessarily drawn to scale. The configurations shown in the drawings are merely examples, and should not be construed as limiting the scope of the invention in any manner.

DETAILED DESCRIPTION

A learning automaton can be trained to merge data from input data streams, optionally with different data rates, into a single output data stream. The learning automaton can learn over time from the input data streams. The input data streams can be low-pass filtered to suppress data having frequencies greater than a time-varying cutoff frequency. Initially, the cutoff frequency can be relatively low, so that the effective data rates of the input data streams are all equal. This can ensure that initially, high data-rate data does not overwhelm low data-rate data. As the learning automaton learns, an entropy of the learning automaton changes more slowly, and the cutoff frequency is increased over time. When the entropy of the learning automaton has stabilized, the training is completed, and the cutoff frequency can be large enough to pass all the input data streams, unfiltered, to the learning automaton.

There are benefits to using some or all of the features described in detail below, including using a low-pass filter to filter input data streams before they reach the learning automaton, using a time-evolving state of the learning automaton (e.g., an entropy of the learning automaton) as a way to measure performance of the learning automaton, and using a difference in entropy (e.g., changes in entropy over time) to determine settings of the low-pass filter (e.g., a width of a pass band of the low-pass filter). For example, using some or all of these features can speed up the learning process of the learning automaton. The learning automaton can readily learn the relative reliabilities of the input data streams, without having to explicitly account for relative data rates of the input data streams.

Figure 1:
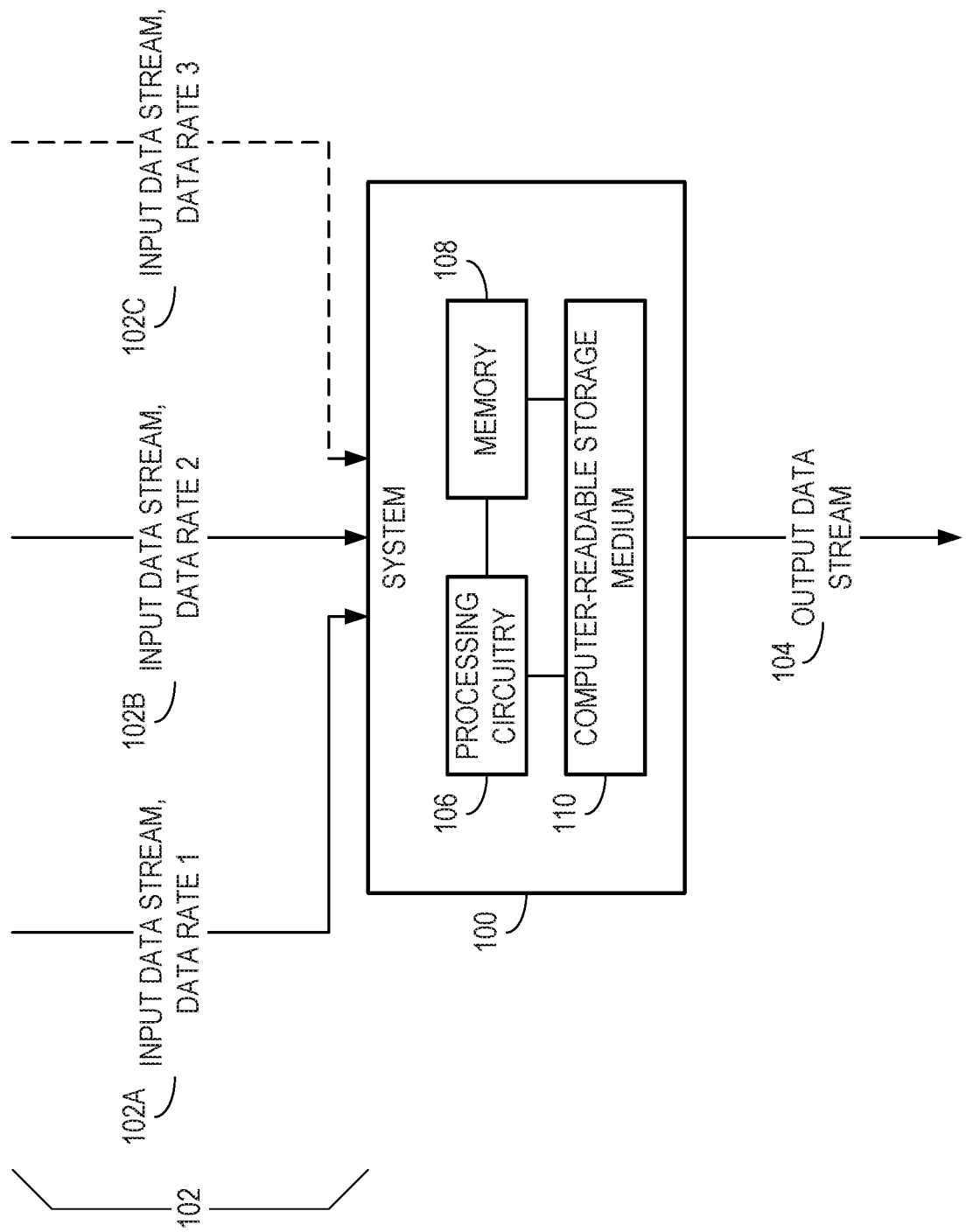
FIG. 1 shows an example of a system that can merge data streams, optionally having different data rates, in accordance with some embodiments.

FIG. 1 shows an example of a system 100 that can train a learning automaton to merge data from data streams having different data rates, in accordance with some embodiments. In some examples, the system 100 can include processing circuitry 106, which can include one or more processors, and memory 108, including instructions that, when executed by the processing circuitry 106, cause the processing circuitry 106 to perform particular operations. In some examples, the system 100 can include a computer-readable storage medium 110 storing instructions that, when executed by processing circuitry 106, cause the processing circuitry 106 to perform particular operations. The system 100 of FIG. 1 is but one system that can train a learning automaton to merge data from data streams having different data rates; other systems can also be used.

The system 100 can receive input data streams 102. The input data streams 102 can include two input data streams 102A, 102B, and, optionally, one or more additional data streams, such as 102C. The system can merge the input data streams 102 into a single output data stream 104.

Typically, the input data streams 102 can represent multiple measurements of a particular physical quantity, such as temperature at a particular location, or an overhead image of a particular location. The input data streams 102 can be produced by multiple sources, such as multiple temperature sensors or multiple orbiting satellites. Using data from multiple sources can improve reliability of the measured data, so that if one data source fails briefly, data from another source can automatically be used to replace the data from the failing source.

As discussed in detail below, it can be beneficial to use a learning automaton to merge the input data streams 102 into a single output data stream 104. The learning automaton can learn the typical behaviors for the input data streams 102, and by doing so, can spot potentially unreliable data in the input data streams 102.

For example, for a system detecting temperature in Minneapolis in January, the learning automaton can learn typical patterns for the temperature. For example, the temperature can typically cycle between about 22° F. (−5° C.) in late afternoon and about 6° F. (−14° C.) in pre-dawn hours. Temperatures can often vary by ten degrees or twenty degrees from these average values, and the automaton can learn that such behavior is normal. If one of the input data streams suddenly shows an abnormally high temperature reading of 75° F. (24° C.), for Minneapolis in January, while the other input data streams show more typical, colder readings of 10° F. (−12° C.), the high temperature reading is likely erroneous. The learning automaton can spot such irregularities, can flag such irregularities as being spurious or erroneous, can ignore the erroneous data point or points, and can rely on the other input data streams to replace the abnormally high temperature reading or readings.

The data rates of the input data streams 102 can differ from one another. For example, a first input data stream 102A may have a first data rate of 2 Hz, a second input data stream 102B may have a second data rate of 10 Hz, a third input data stream 102C may have a second data rate of 20 Hz, and so forth. The data rate of the output data stream 104 can be set to any suitable data rate, which may or may not correspond to any of the data rates of the input data streams 102.

Because the data rates of the input data streams 102 can differ from one another, it can be difficult to train an automaton to spot irregularities in the data. Specifically, because an input data stream with a relatively high data rate has more data (e.g., more data points) than an input data stream with a relatively low data rate, the learning automaton may be too heavily influenced by the high data rate data stream, and not influenced enough by the low data rate data stream.

To overcome this imbalance in the learning behavior of the automaton, the system can use a low-pass filter with a pass band that widens over time.

Such a low-pass filter can initially effectively reduce the data rate of the high data rate input data stream to match that of the low data rate input data stream, or can reduce both data rates to a common value, so that the automaton can learn equally from each of the input data streams. Such a scheme can apply to two input data streams, or to more than two input data streams, with the low-pass filter initially effectively reducing the data rates of all but one input data stream to match the slowest input data stream, or reducing the data rates of all the input data streams to a common value.

Specifically, the low-pass filter can help reduce the presence of abrupt transients in the data of the input data streams, which can help prevent the automaton from learning that the abrupt transients are normal behavior. For example, if a temperature measurement drops fifty degrees in one measurement, then increases by fifty degrees in the next measurement, we assume that the abrupt drop and rise in the temperature is erroneous, and we want to avoid teaching the automaton that such abrupt changes in temperature are typical behavior. The low-pass filter can initially smooth out the abrupt changes in temperature, so that the automaton can learn that temperature typically changes smoothly, or more gradually, over time.

Once the automaton has moved past the initial learning phase, and has learned the typical behavior of the data (e.g., temperature changes relatively slowly), the low-pass filter can widen. The wider low-pass filter can let the more transient data pass through the input data streams. Because the automaton has learned that the more transient behavior is a typical, the automaton can flag the transient data as being potentially erroneous.

As the automaton progresses in it its learning, the low-pass filter can widen further. Eventually, as the automaton is thoroughly trained, the low-pass filter can widen to the point of letting through all the data in all the input data streams. At this point, the effect of the low-pass filter is negligible (e.g. it passes everything), and the low-pass filter can be removed.

The various stages of the low-pass filter (e.g., how wide to make the pass band initially, when to widen the pass band and by how much, when to remove the low-pass filter) can be linked to progression of the learning automaton, as discussed in detail below.

Figure 2:
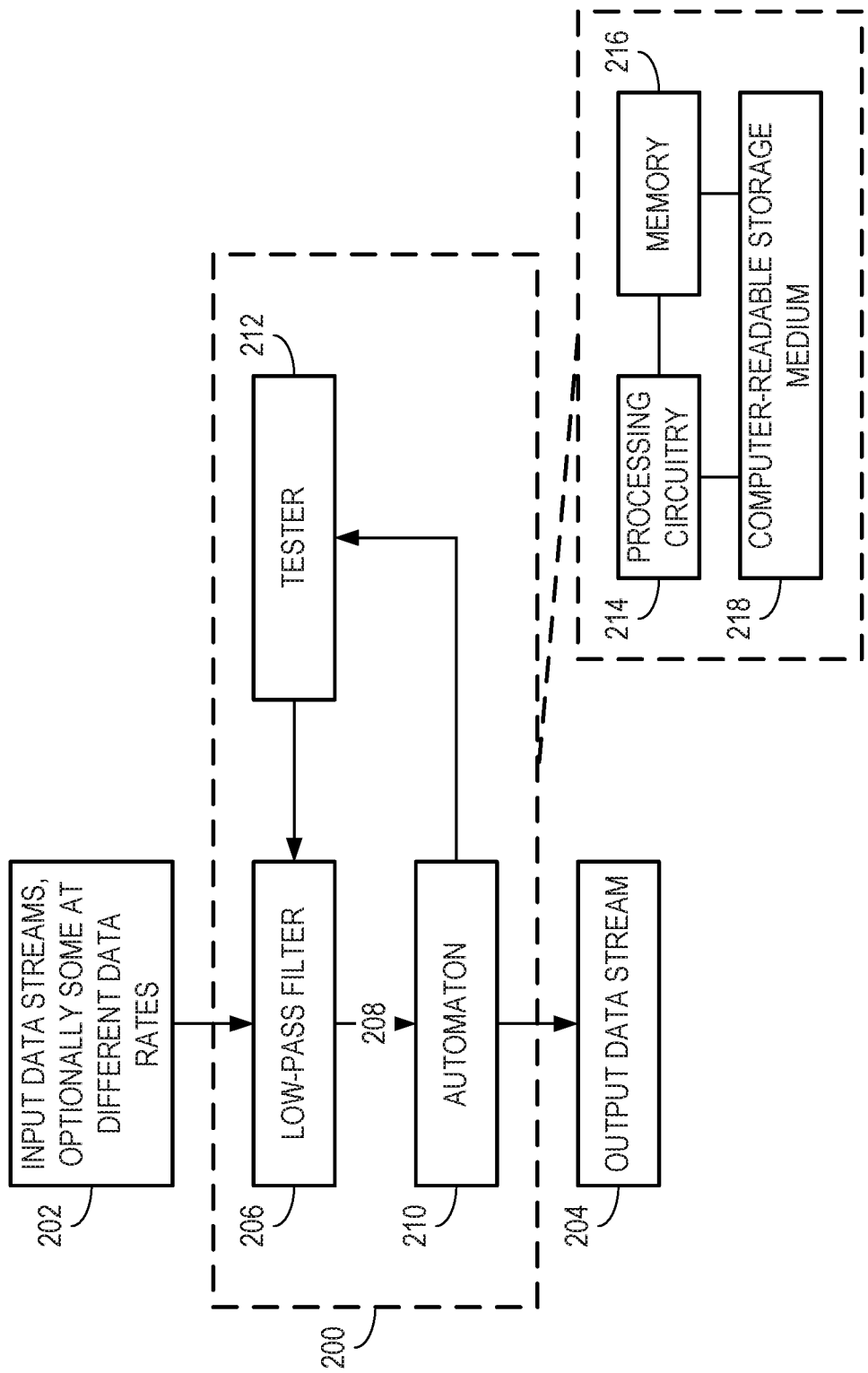
FIG. 2 shows a more detailed example of a system that can merge a plurality of input data streams, at least two of the input data streams having different data rates, in accordance with some embodiments.

FIG. 2 shows a more detailed example of a system 200 that can train a learning automaton to merge data from data streams having different data rates, in accordance with some embodiments. In some examples, the system 200 can include processing circuitry 214, which can include one or more processors, and memory 216, including instructions that, when executed by the processing circuitry 214, cause the processing circuitry 214 to perform particular operations. In some examples, the system 200 can include a computer-readable storage medium 218 storing instructions that, when executed by processing circuitry 214, cause the processing circuitry 214 to perform particular operations. The system 200 of FIG. 2 is but one system that can merge data streams; other systems can also be used.

A low-pass filter circuit 206 can filter the plurality of input data streams 202 to form a respective plurality of filtered data streams 208. The low-pass filter circuit 206 can widen over time such that the filtered data streams 208 have a same data rate at a first time and at least two of the filtered data streams have different data rates at a second time after the first time.

In the present document, it will be understood that the term data rate is intended to signify the rate at which meaningful data appears in a data stream. For example, if a data stream with a data rate of 30 Hz is run through a low-pass filter that blocks all frequencies higher than 10 Hz, then the filtered data stream is said to have a data rate of 10 Hz. In practice, the filtered data stream may include data points that appear with a frequency of 30 Hz, but the data points do not include any data having a frequency above 10 Hz.

A learning automaton circuit 210 can merge data in the filtered data streams 208 into an output data stream 204. The learning automaton circuit 210 can learn equally from data in each of the filtered data streams at the first time (e.g., when the filtered data streams 208 have a same data rate).

A tester circuit 212 can determine a time-evolving width of a pass band of the low-pass filter circuit 206, based at least in part on a time-evolving state of the learning automaton circuit 210.

Any or all of the low-pass filter circuit 206, the learning automaton circuit 210, and the tester circuit 212 can be implemented on hardware, software, or a combination of hardware and software. Any or all of the low-pass filter circuit 206, the learning automaton circuit 210, and the tester circuit 212 can be connected via a wired or wireless network to one or more additional servers, to receive, store, and/or process the input data streams 202, and/or transmit, store, and/or process the output data stream 204. Any other circuit or circuitry discussed herein may also be executed in hardware, software, or a combination of hardware and software.

The low-pass filter circuit 206, the learning automaton circuit 210, and the tester circuit 212 are discussed in detail below. As discussed below, these elements cooperate to perform the operations of filter, automaton, testing, and reset filter width.

Figure 3:
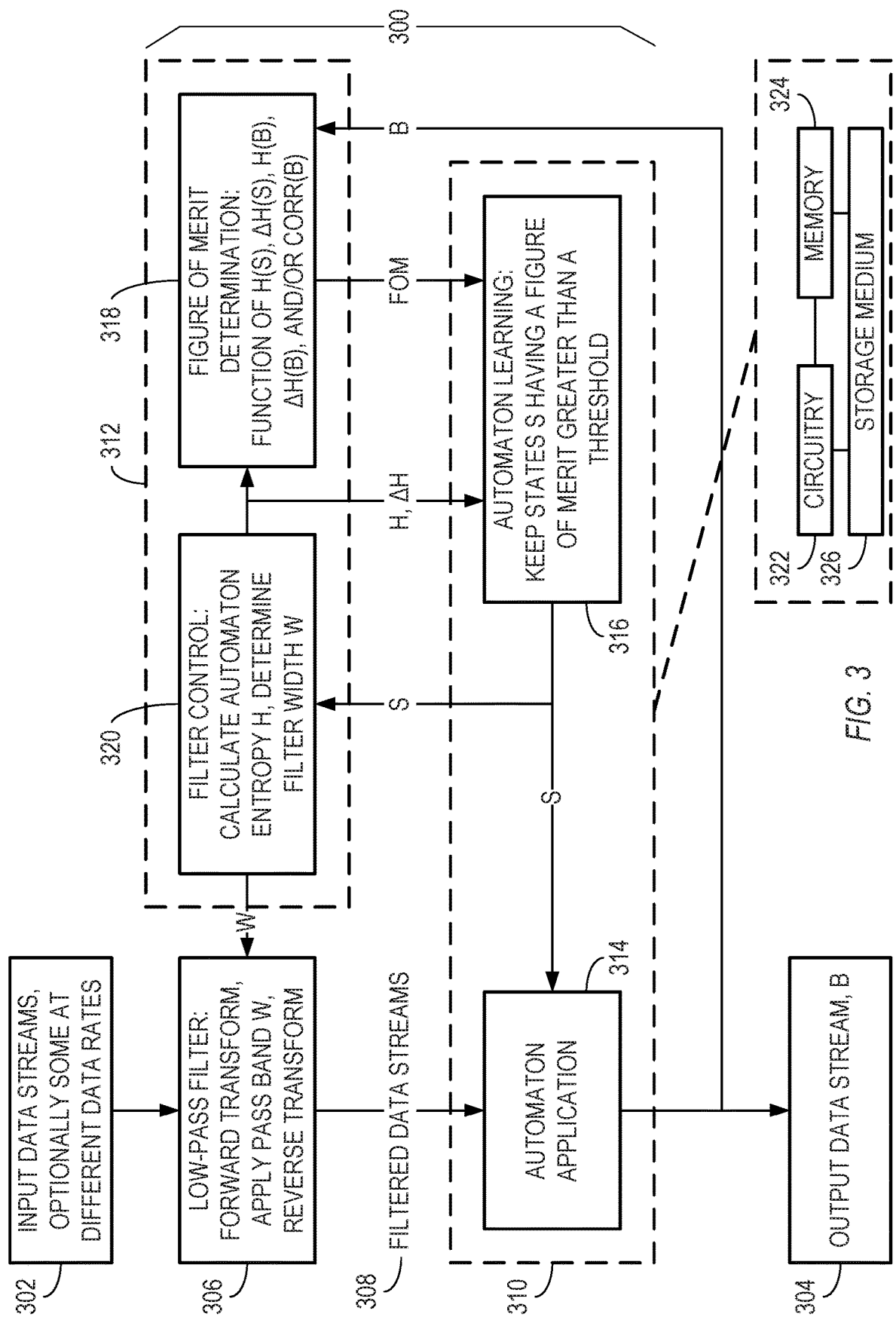
FIG. 3 shows an even more detailed example of a system that can merge a plurality of input data streams, at least two of the input data streams having different data rates, in accordance with some embodiments.

FIG. 3 shows an even more detailed example of a system 300 that can train a learning automaton to merge data from data streams having different data rates, in accordance with some embodiments. In some examples, the system 300 can include processing circuitry 322, which can include one or more processors, and memory 324, including instructions that, when executed by the processing circuitry 322, cause the processing circuitry 322 to perform particular operations. In some examples, the system 300 can include a computer-readable storage medium 326 storing instructions that, when executed by processing circuitry 322, cause the processing circuitry 322 to perform particular operations. The system 300 of FIG. 3 is but one system that can merge data streams; other systems can also be used.

A low-pass filter circuit 306 can filter the plurality of input data streams 302 to form a respective plurality of filtered data streams 308. In some examples, the input data streams 302 can be time-stamped, so that data can be synchronized downstream by the learning automaton circuit 310. In some examples, the low-pass filter circuit 306 can widen over time such that the filtered data streams 308 have a same data rate at a first time and at least two of the filtered data streams 308 have different data rates at a second time after the first time.

In some examples, the low-pass filter circuit 306 can transform data in the input data streams 302 from the time domain to the frequency domain to form transformed data. In some examples, the low-pass filter circuit 306 can apply a fast Fourier transform to the data in the input data streams 302 to form the transformed data. Other suitable transforms can be used, including a discrete Fourier transforms, wavelet transforms, discrete wavelet transforms, or other reversible transforms.

In some examples, the low-pass filter circuit 306 can attenuate the transformed data outside the pass band to form filtered transformed data.

In some examples, the low-pass filter circuit 306 can inverse transform the filtered transformed data from the frequency domain to the time domain to form filtered data in the filtered data streams 308. In some examples, the low-pass filter circuit 306 can apply an inverse fast Fourier transform to the filtered transformed data to form the filtered data in the filtered data streams 308. Other suitable inverse transforms can be used, including an inverse discrete Fourier transforms, inverse wavelet transforms, inverse discrete wavelet transforms, or other reversible inverse transforms.

A learning automaton circuit 310 can merge data in the filtered data streams 308 into an output data stream 304. The output data stream 304 can be represented by quantity (B). The portion of the learning automaton circuit 310 that performs the merging can be referred to as the automaton application 314.

In addition to the automaton application 314, the learning automaton circuit 310 can include a portion referred to as the automaton learning 316. In some examples, the automaton learning 316 can be implemented as a fuzzy genetic learning automaton classifier, which can break down the learning process of the data into a series of evolutionary steps by using a chromosome analogy. Typically, learning can occur over just a few generations.

The automaton learning 316 can simulate a plurality of allowable state transitions (S) that determine how heavily to weight data in each of the filtered data streams 308. The automaton learning 316 can learn by keeping state transitions (S) having a figure of merit (FOM) greater than a specified threshold, and excluding state transitions (S) having a figure of merit (FOM) less than a specified threshold. The automaton learning 316 can learn equally from the data in each of the filtered data streams at the first time (e.g., when the filtered data streams 308 have a same data rate).

In some examples, the learning automaton circuit 310 can have an internal structure referred to as a state transition cube. The state transition cube can have an entropy associated with the cube at any particular time. The entropy, and/or a change in the entropy, can be used to determine a width of the pass band of the low-pass filter.

In the early learning phase, the learning automaton circuit 310 can have insufficient time to understand and predict behavior of the system. In the early learning phase, it is helpful to remove some or all of the structure of the data to lock onto a "big picture" understanding of the data. The low-pass filter can help remove some or all of the data structure. In the early learning stage, the state transition cube can be largely a stack of identity matrices, one for each input data stream.

Beyond the early learning phase, the learning automaton circuit 310 can be predictive enough that the low-pass filter can be effectively shut down (e.g., made infinitely wide, or wide enough to no longer perform any filtering function). As the width of the pass band of the low-pass filter increases to include the whole frequency spectrum of the input data streams, the low-pass filtering operation can become just a diagonal matrix, passing the input data streams through unchanged. This can help ensure that the predictive aspects of the automaton control the output as the learning phase matures.

A tester circuit 312 can include a portion referred to as figure of merit determination 318. The figure of merit determination 318 can calculate the time-evolving figure of merit (FOM) for each non-excluded state transition (S) based on an entropy of the state transition H(S), a change in entropy of the state transition $\Delta$H(S), an entropy of the output data stream H(B), a change in entropy of the output data stream $\Delta$H(B), and/or a correlation among channels in the output data stream Corr(B). Mathematically, to show that the figure of merit (FOM) can be a function of any or all of these quantities, the figure of merit (FOM) can be written as FOM(H(S), $\Delta$H(S), H(B), $\Delta$H(B), Corr(B)). In some examples, the tester circuit 312 can calculate a time-evolving figure of merit (FOM) for each allowable state transition (S), for each increment of a clock of the learning automaton circuit 310.

The tester circuit 312 can include a portion referred to as filter control 320. The filter control 320 can calculate a time-evolving entropy (H) of the learning automaton circuit 310 by summing the entropies of each non-excluded state transition (S). For example, the tester circuit 312 can calculate the entropy as follows:

$$H=(-1)\Sigma_{ijk}S_{ijk}\log_2(S_{ijk}),$$

where quantity H is the entropy of the learning automaton circuit 310, and quantities $S_{ijk}$ are all the allowed state transitions in the learning automaton circuit 310.

The filter control 320 can determine a time-evolving width (W) of a pass band of the low-pass filter circuit 306 based at least in part on the time-evolving entropy (H) of the learning automaton circuit 310.

In some examples, the learning automaton circuit 310 has a time-evolving entropy (H) that decreases over time, and the tester circuit 312 can determine the time-evolving width (W) of the pass band of the low-pass filter circuit 306, based at least in part on the time-evolving entropy (H) of the learning automaton circuit 310.

In some examples, the tester circuit 312 can calculate the time-evolving width (W) to be proportional to a value of the entropy (H), raised to a specified exponent. In some examples, tester circuit 312 can determine the width of the pass band of the low-pass filter circuit 306 as follows:

$$W=\beta H^\alpha N,$$

where quantity W is the width of the pass band, quantity H is the entropy of the learning automaton circuit 310, quantity N is an aperture width of the data, such as 1024

(e.g., where W can be updated every 1024 clock ticks), and quantities β and α are dimensionless quantities that can be considered constants (e.g., invariant with respect to W, H, and N), which can be adjusted as needed for each particular application of the system 300.

In some examples, the tester circuit 312 can provide the calculated time-evolving width (W) to the low-pass filter circuit 306 at a rate that is less than a clock rate of the learning automaton circuit 310.

In some examples, when a change between successive values of the time-evolving entropy (H) of the learning automaton circuit 310 is below a specified threshold, the time-evolving entropy (H) of the learning automaton circuit 310 has stabilized, and the tester circuit 312 can determine the width (W) of the pass band of the low-pass filter circuit 306 to be sufficiently large such that the filtered data streams 308 have the same data rates as the corresponding input data streams 302. At this stage, the low-pass filter circuit 306 can pass the input data streams 302 without modification, so that the low-pass filter circuit 306 can be bypassed or disabled, and the input data streams 302 can pass directly into the learning automaton circuit 310.

Figure 4:
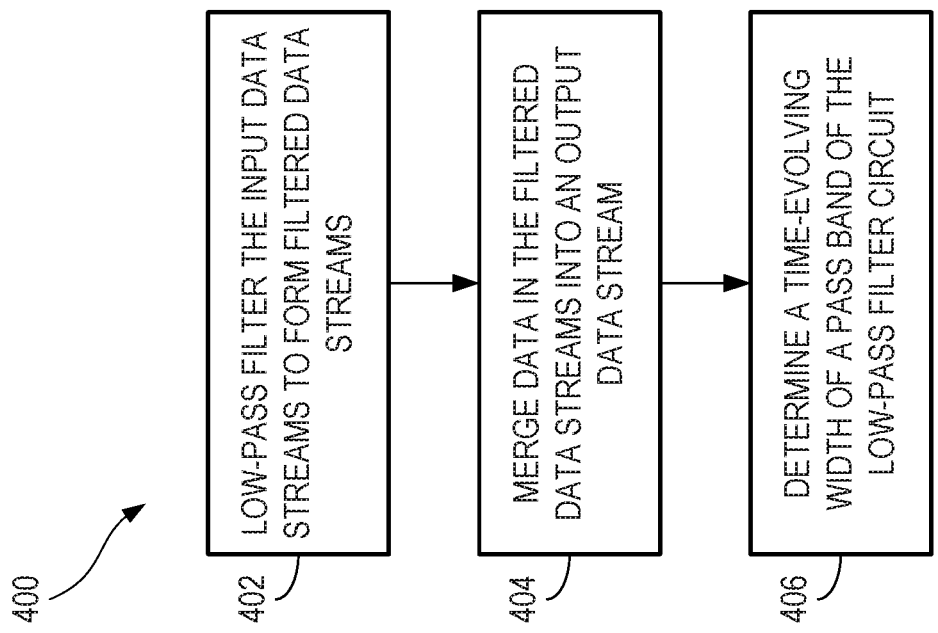
FIG. 4 shows an example of a method for merging a plurality of input data streams, at least two of the input data streams having different data rates, in accordance with some embodiments.

FIG. 4 shows an example of a method 400 for merging a plurality of input data streams, at least two of the input data streams having different data rates, in accordance with some embodiments. The method 400 can be implemented on any of the systems 100, 200, 300, or on any other suitable system. The method 400 is but one method for merging a plurality of input data streams; other suitable methods can also be used.

At operation 402, the plurality of input data streams can be low-pass filtered with a low-pass filter circuit to form a respective plurality of filtered data streams. The low-pass filter circuit can widen over time such that the filtered data streams have a same data rate at a first time and at least two of the filtered data streams have different data rates at a second time after the first time.

At operation 404, data in the filtered data streams can be merged with a learning automaton circuit into an output data stream. The learning automaton circuit can learn equally from data in each of the filtered data streams at the first time.

At operation 406, a time-evolving width of a pass band of the low-pass filter circuit can be determined with a tester circuit, based at least in part on a time-evolving state of the learning automaton circuit.

In some examples, the learning automaton circuit can optionally have a time-evolving entropy that decreases over time. In some of these examples, the method 400 can optionally further include determining, with the tester circuit, the time-evolving width of the pass band of the low-pass filter circuit, based at least in part on the time-evolving entropy of the learning automaton circuit.

In some examples, the method 400 can optionally further include simulating, with the learning automaton circuit, a plurality of allowable state transitions that determine how heavily to weight the data in each of the filtered data streams. In some of these examples, the method 400 can optionally further include calculating, with the tester circuit, a time-evolving figure of merit for each allowable state transition, for each increment of a clock of the learning automaton circuit, based on at least one of an entropy of the state transition, a change in entropy of the state transition, an entropy of the output data stream, a change in entropy of the output data stream, or a correlation among channels in the output data stream. In some of these examples, the method 400 can optionally further include learning, with the learning automaton circuit, by excluding state transitions having a figure of merit less than a specified threshold. In some of these examples, the method 400 can optionally further include calculating, with the tester circuit, the time-evolving entropy of the learning automaton circuit by summing the entropies of each non-excluded state transition; In some of these examples, the method 400 can optionally further include calculating, with the tester circuit, the time-evolving width of the controllable pass band based at least in part on the time-evolving entropy of the learning automaton circuit.

In some examples, the method 400 can optionally further include providing the calculated time-evolving width to the low-pass filter circuit at a rate that is less than a clock rate of the learning automaton circuit.

In some examples, when a change between successive values of the time-evolving entropy of the learning automaton circuit is below a specified threshold, the time-evolving entropy of the learning automaton circuit has stabilized, and the method 400 can optionally further include determining the width of the pass band of the low-pass filter circuit to be sufficiently large such that the filtered data streams have the same data rates as the corresponding input data streams. At this stage, the low-pass filter circuit can pass the input data streams without modification, so that the low-pass filter circuit can be bypassed or disabled, and the input data streams can pass directly into the learning automaton circuit.

In the foregoing detailed description, the method and apparatus of the present disclosure have been described with reference to specific embodiments thereof. It will, however, be evident that various modifications and changes may be made thereto without departing from the broader spirit and scope of the present disclosure. The present specification and figures are accordingly to be regarded as illustrative rather than restrictive.

To further illustrate the device and related method disclosed herein, a non-limiting list of examples is provided below. Each of the following non-limiting examples can stand on its own, or can be combined in any permutation or combination with any one or more of the other examples.

In Example 1, a system for training a learning automaton to merge data from data streams having different data rates can include: processing circuitry; and memory, including instructions that, when executed by the processing circuitry, cause the processing circuitry to: merge, with a learning automaton, data in a plurality of input data streams into a single output data stream, the learning automaton configured to learn over time from the input data streams; perform a low-pass filtering operation on the input data streams to suppress data in the input data streams having frequencies greater than a time-varying cutoff frequency; and increase the cutoff frequency over time from a first value, at which the low-pass filtered input data streams have a same data bandwidth, to a second value, at which at least two of the low-pass filtered input data streams have different data bandwidths.

In Example 2, the system of Example 1 can optionally be configured such that: the learning automaton has a time-evolving entropy that changes over time as the learning automaton learns; and the instructions, when executed by the processing circuitry, further cause the processing circuitry to determine a time-varying value of the cutoff frequency, based at least in part on the time-evolving entropy of the learning automaton.

In Example 3, the system of any one of Examples 1-2 can optionally be configured such that the instructions, when executed by the processing circuitry, further cause the processing circuitry to: increase the cutoff frequency over time to a third value that exceeds the data bandwidths of all of the input data streams, prior to the low-pass filtering operation.

In Example 4, the system of any one of Examples 1-3 can optionally be configured such that the instructions, when executed by the processing circuitry, further cause the processing circuitry to: determine that the value of the cutoff frequency exceeds the data bandwidths of all of the input data streams by: comparing successive values of the time-evolving entropy of the learning automaton; determining that a difference between successive values of the time-evolving entropy is below a specified threshold; and determining that the time-evolving entropy of the learning automaton has stabilized.

In Example 5, the system of any one of Examples 1-4 can optionally be configured such that the instructions, when executed by the processing circuitry, further cause the processing circuitry to: determine that that the cutoff frequency exceeds the data bandwidths of all of the input data streams, prior to the low-pass filtering operation; and in response to determining that the cutoff frequency exceeds the data bandwidths of all of the input data streams, disable the low-pass filtering operation, such that the learning automaton merges the input data streams, without the low-pass filtering operation, into the single output data stream.

In Example 6, the system of any one of Examples 1-5 can optionally be configured such that the learning automaton is configured to simulate a plurality of allowable state transitions that determine how heavily to weight the data in each of the input data streams.

In Example 7, the system of any one of Examples 1-6 can optionally be configured such that the instructions, when executed by the processing circuitry, further cause the processing circuitry to: calculate a time-evolving figure of merit for each allowable state transition, for each increment of a clock of the learning automaton.

In Example 8, the system of any one of Examples 1-7 can optionally be configured such that the instructions, when executed by the processing circuitry, further cause the processing circuitry to: increase the cutoff frequency over time in discrete steps at discrete time intervals, the discrete time intervals occurring at a rate that is less than a clock rate of the learning automaton.

In Example 9, the system of any one of Examples 1-8 can optionally be configured such that the instructions, when executed by the processing circuitry, further cause the processing circuitry to: calculate the time-evolving figure of merit for each allowable state transition based on at least one of an entropy of the state transition, a change in entropy of the state transition, an entropy of the output data stream, a change in entropy of the output data stream, or a correlation among channels in the output data stream.

In Example 10, the system of any one of Examples 1-9 can optionally be configured such that the learning automaton is configured to learn by excluding state transitions having a figure of merit less than a specified threshold.

In Example 11, the system of any one of Examples 1-10 can optionally be configured such that the instructions, when executed by the processing circuitry, further cause the processing circuitry to: calculate the time-evolving entropy of the learning automaton by summing the entropies of each non-excluded state transition; and calculate the time-varying value of the cutoff frequency based at least in part on the time-evolving entropy of the learning automaton.

In Example 12, the system of any one of Examples 1-11 can optionally be configured such that the instructions, when executed by the processing circuitry, further cause the processing circuitry to: calculate, at a first time, the value of the cutoff frequency to be proportional to a value of the entropy of the learning automaton, at the first time, raised to a specified exponent.

In Example 13, the system of any one of Examples 1-12 can optionally be configured such that the instructions, when executed by the processing circuitry, further cause the processing circuitry to perform the low-pass filtering operation on the input data streams by: transforming data in the input data streams from the time domain to the frequency domain to form transformed data; attenuating data in the transformed data for frequencies greater than the time-varying cutoff frequency to form filtered transformed data; and inverse transforming the filtered transformed data from the frequency domain to the time domain to form filtered data to be merged by the learning automaton.

In Example 14, the system of any one of Examples 1-13 can optionally be configured such that the instructions, when executed by the processing circuitry, further cause the processing circuitry to perform the transforming by applying a fast Fourier transform to the data in the input data streams to form the transformed data, and perform the inverse transforming by applying an inverse fast Fourier transform to the filtered transformed data to form the filtered data to be merged by the learning automaton.

In Example 15, a system for training a learning automaton to merge data from data streams having different data rates can include: processing circuitry; and memory, including instructions that, when executed by the processing circuitry, cause the processing circuitry to: perform a low-pass filtering operation on a first input data stream to form a first filtered data stream, the low-pass filtering operation configured to suppress data in the first input data stream having frequencies greater than a cutoff frequency, the cutoff frequency configured to increase over time from an initial value; perform a low-pass filtering operation on a second input data stream to form a second filtered data stream, the low-pass filtering operation configured to suppress data in the second input data stream having frequencies greater than the cutoff frequency, the first and second filtered data streams having a same data bandwidth when the cutoff frequency is at the initial value; merge, with a learning automaton, data in the first and second filtered data streams into a single output data stream, the learning automaton configured to learn over time from the first and second input data streams; the learning automaton having a time-evolving entropy that changes over time as the learning automaton learns; and update a value of the cutoff frequency of the low-pass filtering operation, based at least in part on the time-evolving entropy of the learning automaton.

In Example 16, a computer-readable storage medium storing instructions that, when executed by processing circuitry, can cause the processing circuitry to: merge, with a learning automaton, data in a plurality of input data streams into a single output data stream, the learning automaton configured to learn over time from the input data streams; perform a low-pass filtering operation on the input data streams to suppress data in the input data streams having frequencies greater than a time-varying cutoff frequency; and increase the cutoff frequency over time from a first value, at which the low-pass filtered input data streams have a same data bandwidth, to a second value, at which at least two of the low-pass filtered input data streams have different data bandwidths.

In Example 17, the computer-readable storage medium of Example 16 can optionally be configured such that: the learning automaton has a time-evolving entropy that changes over time as the learning automaton learns; and the instructions, when executed by the processing circuitry, further cause the processing circuitry to determine a time-varying value of the cutoff frequency, based at least in part on the time-evolving entropy of the learning automaton.

In Example 18, the computer-readable storage medium of any one of Examples 16-17 can optionally be configured such that the instructions, when executed by the processing circuitry, further cause the processing circuitry to: increase the cutoff frequency over time to a third value that exceeds the data bandwidths of all of the input data streams, prior to the low-pass filtering operation.

In Example 19, the computer-readable storage medium of any one of Examples 16-18 can optionally be configured such that the instructions, when executed by the processing circuitry, further cause the processing circuitry to: determine that the value of the cutoff frequency exceeds the data bandwidths of all of the input data streams by: comparing successive values of the time-evolving entropy of the learning automaton; determining that a difference between successive values of the time-evolving entropy is below a specified threshold; and determining that the time-evolving entropy of the learning automaton has stabilized.

In Example 20, the computer-readable storage medium of any one of Examples 16-19 can optionally be configured such that the instructions, when executed by the processing circuitry, further cause the processing circuitry to: determine that that the cutoff frequency exceeds the data bandwidths of all of the input data streams, prior to the low-pass filtering operation; and in response to determining that the cutoff frequency exceeds the data bandwidths of all of the input data streams, disable the low-pass filtering operation, such that the learning automaton merges the input data streams, without the low-pass filtering operation, into the single output data stream.

In Example 21, a system for merging a plurality of input data streams, at least two of the input data streams having different data rates, can include: a low-pass filter circuit configured to filter the plurality of input data streams to form a respective plurality of filtered data streams, the low-pass filter circuit further configured to widen over time such that the filtered data streams have a same data rate at a first time and at least two of the filtered data streams have different data rates at a second time after the first time; a learning automaton circuit configured to merge data in the filtered data streams into an output data stream, the learning automaton circuit further configured to learn equally from data in each of the filtered data streams at the first time; and a tester circuit configured to determine a time-evolving width of a pass band of the low-pass filter circuit, based at least in part on a time-evolving state of the learning automaton circuit.

In Example 22, the system of Example 21 can optionally be configured such that the learning automaton circuit has a time-evolving entropy that decreases over time; and the tester circuit is configured to determine the time-evolving width of the pass band of the low-pass filter circuit, based at least in part on the time-evolving entropy of the learning automaton circuit.

In Example 23, the system of any one of Examples 21-22 can optionally be configured such that the learning automaton circuit is configured to simulate a plurality of allowable state transitions that determine how heavily to weight the data in each of the filtered data streams.

In Example 24, the system of any one of Examples 21-23 can optionally be configured such that the tester circuit is configured to calculate a time-evolving figure of merit for each allowable state transition, for each increment of a clock of the learning automaton circuit.

In Example 25, the system of any one of Examples 21-24 can optionally be configured such that the tester circuit is configured to calculate the time-evolving figure of merit for each allowable state transition based on at least one of an entropy of the state transition, a change in entropy of the state transition, an entropy of the output data stream, a change in entropy of the output data stream, or a correlation among channels in the output data stream.

In Example 26, the system of any one of Examples 21-25 can optionally be configured such that the learning automaton circuit is configured to learn by excluding state transitions having a figure of merit less than a specified threshold.

In Example 27, the system of any one of Examples 21-26 can optionally be configured such that the tester circuit is configured to: calculate the time-evolving entropy of the learning automaton circuit by summing the entropies of each non-excluded state transition; and calculate the time-evolving width of the controllable pass band based at least in part on the time-evolving entropy of the learning automaton circuit.

In Example 28, the system of any one of Examples 21-27 can optionally be configured such that the tester circuit is configured to calculate the time-evolving width to be proportional to a value of the entropy, raised to a specified exponent.

In Example 29, the system of any one of Examples 21-28 can optionally be configured such that the tester circuit is configured to provide the calculated time-evolving width to the low-pass filter circuit at a rate that is less than a clock rate of the learning automaton circuit.

In Example 30, the system of any one of Examples 21-29 can optionally be configured such that when a change between successive values of the time-evolving entropy of the learning automaton circuit is below a specified threshold, the time-evolving entropy of the learning automaton circuit has stabilized, and the tester circuit is configured to determine the width of the pass band of the low-pass filter circuit to be sufficiently large such that the filtered data streams have the same data rates as the corresponding input data streams.

In Example 31, the system of any one of Examples 21-30 can optionally be configured such that the low-pass filter circuit is configured to: transform data in the input data streams from the time domain to the frequency domain to form transformed data; attenuate the transformed data outside the pass band to form filtered transformed data; and inverse transform the filtered transformed data from the frequency domain to the time domain to form filtered data in the filtered data streams.

In Example 32, the system of any one of Examples 21-31 can optionally be configured such that the low-pass filter circuit is further configured to: apply a fast Fourier transform to the data in the input data streams to form the transformed data; and apply an inverse fast Fourier transform to the filtered transformed data to form the filtered data in the filtered data streams.

In Example 33, the system of any one of Examples 21-32 can optionally be configured such that the input data streams are time-stamped.

In Example 34, a method for merging a plurality of input data streams, at least two of the input data streams having different data rates, can include: low-pass filtering, with a low-pass filter circuit, the plurality of input data streams to form a respective plurality of filtered data streams, the low-pass filter circuit widening over time such that the filtered data streams have a same data rate at a first time and at least two of the filtered data streams have different data rates at a second time after the first time; merging, with a learning automaton circuit, data in the filtered data streams into an output data stream, the learning automaton circuit further configured to learn equally from data in each of the filtered data streams at the first time; and determining, with a tester circuit, a time-evolving width of a pass band of the low-pass filter circuit, based at least in part on a time-evolving state of the learning automaton circuit.

In Example 35, the method of Example 34 can optionally be configured such that the learning automaton circuit has a time-evolving entropy that decreases over time; and further comprising determining, with the tester circuit, the time-evolving width of the pass band of the low-pass filter circuit, based at least in part on the time-evolving entropy of the learning automaton circuit.

In Example 36, the method of any one of Examples 34-35 can optionally further include: simulating, with the learning automaton circuit, a plurality of allowable state transitions that determine how heavily to weight the data in each of the filtered data streams; calculating, with the tester circuit, a time-evolving figure of merit for each allowable state transition, for each increment of a clock of the learning automaton circuit, based on at least one of an entropy of the state transition, a change in entropy of the state transition, an entropy of the output data stream, a change in entropy of the output data stream, or a correlation among channels in the output data stream; learning, with the learning automaton circuit, by excluding state transitions having a figure of merit less than a specified threshold; calculating, with the tester circuit, the time-evolving entropy of the learning automaton circuit by summing the entropies of each non-excluded state transition; calculating, with the tester circuit, the time-evolving width of the controllable pass band based at least in part on the time-evolving entropy of the learning automaton circuit.

In Example 37, the method of any one of Examples 34-36 can optionally further include: providing the calculated time-evolving width to the low-pass filter circuit at a rate that is less than a clock rate of the learning automaton circuit.

In Example 38, the method of any one of Examples 34-37 can optionally be configured such that when a change between successive values of the time-evolving entropy of the learning automaton circuit is below a specified threshold, the time-evolving entropy of the learning automaton circuit has stabilized, and further comprising determining the width of the pass band of the low-pass filter circuit to be sufficiently large such that the filtered data streams have the same data rates as the corresponding input data streams.

In Example 39, a system for merging a plurality of input data streams, at least two of the input data streams having different data rates, can include: a low-pass filter circuit configured to filter the plurality of input data streams to form a respective plurality of filtered data streams, the input data streams being time-stamped, the low-pass filter circuit widening over time such that the filtered data streams have a same data rate at a first time and at least two of the filtered data streams have different data rates at a second time after the first time; a learning automaton circuit configured to: merge data in the filtered data streams into an output data stream, simulate a plurality of allowable state transitions that determine how heavily to weight data in each of the filtered data streams, learn by excluding state transitions having a figure of merit less than a specified threshold, and learn equally from the data in each of the filtered data streams at the first time; and the tester circuit configured to: calculate the time-evolving figure of merit for each non-excluded state transition based on at least one of an entropy of the state transition, a change in entropy of the state transition, an entropy of the output data stream, a change in entropy of the output data stream, or a correlation among channels in the output data stream, calculate a time-evolving entropy of the learning automaton circuit by summing the entropies of each non-excluded state transition, and determine a time-evolving width of a pass band of the low-pass filter circuit based at least in part on the time-evolving entropy of the learning automaton circuit.

In Example 40, the system of Example 38 can optionally be configured such that when a change between successive values of the time-evolving entropy of the learning automaton circuit is below a specified threshold, the time-evolving entropy of the learning automaton circuit has stabilized, and the tester circuit is configured to determine the width of the pass band of the low-pass filter circuit to be sufficiently large such that the filtered data streams have the same data rates as the corresponding input data streams.

In Example 41, a method can include: merging, with a learning automaton, data in a plurality of input data streams into a single output data stream, the learning automaton configured to learn over time from the input data streams; performing a low-pass filtering operation on the input data streams to suppress data in the input data streams having frequencies greater than a time-varying cutoff frequency; and increasing the cutoff frequency over time from a first value, at which the low-pass filtered input data streams have a same data bandwidth, to a second value, at which at least two of the low-pass filtered input data streams have different data bandwidths.

In Example 42, a method can include: performing a low-pass filtering operation on a first input data stream to form a first filtered data stream, the low-pass filtering operation configured to suppress data in the first input data stream having frequencies greater than a cutoff frequency, the cutoff frequency configured to increase over time from an initial value; performing a low-pass filtering operation on a second input data stream to form a second filtered data stream, the low-pass filtering operation configured to suppress data in the second input data stream having frequencies greater than the cutoff frequency, the first and second filtered data streams having a same data bandwidth when the cutoff frequency is at the initial value; merging, with a learning automaton, data in the first and second filtered data streams into a single output data stream, the learning automaton configured to learn over time from the first and second input data streams; the learning automaton having a time-evolving entropy that changes over time as the learning automaton learns; and updating a value of the cutoff frequency of the low-pass filtering operation, based at least in part on the time-evolving entropy of the learning automaton.

What is claimed is:

1. A system for training a learning automaton to merge data from data streams having different data rates, the system comprising:
   processing circuitry; and
   memory, including instructions that, when executed by the processing circuitry, cause the processing circuitry to:
   merge, with a learning automaton, data in a plurality of input data streams into a single output data stream, the learning automaton configured to learn over time from the input data streams;

perform a low-pass filtering operation on the input data streams to suppress data in the input data streams having frequencies greater than a time-varying cutoff frequency; and increase the cutoff frequency over time from a first value, at which the low-pass filtered input data streams have a same data bandwidth, to a second value, at which at least two of the low-pass filtered input data streams have different data bandwidths.

2. The system of claim 1, wherein:

the learning automaton has a time-evolving entropy that changes over time as the learning automaton learns; and the instructions, when executed by the processing circuitry, further cause the processing circuitry to determine a time-varying value of the cutoff frequency, based at least in part on the time-evolving entropy of the learning automaton.

3. The system of claim 2, wherein the instructions, when executed by the processing circuitry, further cause the processing circuitry to:

increase the cutoff frequency over time to a third value that exceeds the data bandwidths of all of the input data streams, prior to the low-pass filtering operation.

4. The system of claim 3, wherein the instructions, when executed by the processing circuitry, further cause the processing circuitry to:

determine that the value of the cutoff frequency exceeds the data bandwidths of all of the input data streams by:

comparing successive values of the time-evolving entropy of the learning automaton;

determining that a difference between successive values of the time-evolving entropy is below a specified threshold; and determining that the time-evolving entropy of the learning automaton has stabilized.

5. The system of claim 3, wherein the instructions, when executed by the processing circuitry, further cause the processing circuitry to:

determine that that the cutoff frequency exceeds the data bandwidths of all of the input data streams, prior to the low-pass filtering operation; and in response to determining that the cutoff frequency exceeds the data bandwidths of all of the input data streams, disable the low-pass filtering operation, such that the learning automaton merges the input data streams, without the low-pass filtering operation, into the single output data stream.

6. The system of claim 2, wherein the learning automaton is configured to simulate a plurality of allowable state transitions that determine how heavily to weight the data in each of the input data streams.

7. The system of claim 6, wherein the instructions, when executed by the processing circuitry, further cause the processing circuitry to:

calculate a time-evolving figure of merit for each allowable state transition, for each increment of a clock of the learning automaton.

8. The system of claim 7, wherein the instructions, when executed by the processing circuitry, further cause the processing circuitry to:

increase the cutoff frequency over time in discrete steps at discrete time intervals, the discrete time intervals occurring at a rate that is less than a clock rate of the learning automaton.

9. The system of claim 7, wherein the instructions, when executed by the processing circuitry, further cause the processing circuitry to:

calculate the time-evolving figure of merit for each allowable state transition based on at least one of an entropy of the state transition, a change in entropy of the state transition, an entropy of the output data stream, a change in entropy of the output data stream, or a correlation among channels in the output data stream.

10. The system of claim 9, wherein the learning automaton is configured to learn by excluding state transitions having a figure of merit less than a specified threshold.

11. The system of claim 10, wherein the instructions, when executed by the processing circuitry, further cause the processing circuitry to:

calculate the time-evolving entropy of the learning automaton by summing the entropies of each non-excluded state transition; and calculate the time-varying value of the cutoff frequency based at least in part on the time-evolving entropy of the learning automaton.

12. The system of claim 11, wherein the instructions, when executed by the processing circuitry, further cause the processing circuitry to:

calculate, at a first time, the value of the cutoff frequency to be proportional to a value of the entropy of the learning automaton, at the first time, raised to a specified exponent.

13. The system of claim 1; wherein the instructions, when executed by the processing circuitry, further cause the processing circuitry to perform the low-pass filtering operation on the input data streams by:

transforming data in the input data streams from the time domain to the frequency domain to form transformed data;

attenuating data in the transformed data for frequencies greater than the time-varying cutoff frequency to form filtered transformed data; and inverse transforming the filtered transformed data from the frequency domain to the time domain to form filtered data to be merged by the learning automaton.

14. The system of claim 13, wherein the instructions, when executed by the processing circuitry, further cause the processing circuitry to perform the transforming by applying a fast Fourier transform to the data in the input data streams to form the transformed data, and perform the inverse transforming by applying an inverse fast Fourier transform to the filtered transformed data to form the filtered data to be merged by the learning automaton.

15. A system for training a learning automaton to merge data from data streams having different data rates, the system comprising:

processing circuitry; and memory, including instructions that, when executed by the processing circuitry, cause the processing circuitry to:

perform a low-pass filtering operation on a first input data stream to form a first filtered data stream, the low-pass filtering operation configured to suppress data in the first input data stream having frequencies greater than a cutoff frequency, the cutoff frequency configured to increase over time from an initial value;

perform a low-pass filtering operation on a second input data stream to form a second filtered data stream, the low-pass filtering operation configured to suppress data in the second input data stream having frequencies greater than the cutoff frequency, the first and second filtered data streams having a same data bandwidth when the cutoff frequency is at the initial value;

merge, with a learning automaton, data in the first and second filtered data streams into a single output data stream, the learning automaton configured to learn over time from the first and second input data streams;

the learning automaton having a time-evolving entropy that changes over time as the learning automaton learns; and update a value of the cutoff frequency of the low-pass filtering operation, based at least in part on the time-evolving entropy of the learning automaton.

16. A non-transitory computer-readable storage medium storing instructions that, when executed by processing circuitry, cause the processing circuitry to:

merge, with a learning automaton, data in a plurality of input data streams into a single output data stream, the learning automaton configured to learn over time from the input data streams;

perform a low-pass filtering operation on the input data streams to suppress data in the input data streams having frequencies greater than a time-varying cutoff frequency; and increase the cutoff frequency over time from a first value, at which the low-pass filtered input data streams have a same data bandwidth, to a second value, at which at least two of the low-pass filtered input data streams have different data bandwidths.

17. The non-transitory computer-readable storage medium of claim 16, wherein:

the learning automaton has a time-evolving entropy that changes over time as the learning automaton learns; and the instructions, when executed by the processing circuitry, further cause the processing circuitry to determine a time-varying value of the cutoff frequency, based at least in part on the time-evolving entropy of the learning automaton.

18. The non-transitory computer-readable storage medium of claim 17, wherein the instructions, when executed by the processing circuitry, further cause the processing circuitry to:

increase the cutoff frequency over time to a third value that exceeds the data bandwidths of all of the input data streams, prior to the low-pass filtering operation.

19. The non-transitory computer-readable storage medium of claim 18, wherein the instructions, when executed by the processing circuitry, further cause the processing circuitry to:

determine that the value of the cutoff frequency exceeds the data bandwidths of all of the input data streams by:

comparing successive values of the time-evolving entropy of the learning automaton;

determining that a difference between successive values of the time-evolving entropy is below a specified threshold; and determining that the time-evolving entropy of the learning automaton has stabilized.

20. The non-transitory computer-readable storage medium of claim 18, wherein the instructions, when executed by the processing circuitry, further cause the processing circuitry to:

determine that that the cutoff frequency exceeds the data bandwidths of all of the input data streams, prior to the low-pass filtering operation; and in response to determining that the cutoff frequency exceeds the data bandwidths of all of the input data streams, disable the low-pass filtering operation, such that the learning automaton merges the input data streams, without the low-pass filtering operation, into the single output data stream.

\* \* \* \* \*